United States Patent [19]

Hayakawa et al.

[11] Patent Number: 5,052,751
[45] Date of Patent: Oct. 1, 1991

[54] WALK-IN DEVICE OF AUTOMOTIVE SEAT HAVING COOPERATING PIVOTED LEVERS

[75] Inventors: Hatsuo Hayakawa; Mikio Honma, both of Yokohama City, Japan

[73] Assignee: Ohi Seisakusho Co., Ltd., Yokohama, Japan

[21] Appl. No.: 537,637

[22] Filed: Jun. 14, 1990

[30] Foreign Application Priority Data

Jun. 22, 1989 [JP] Japan .................. 1-72454[U]

[51] Int. Cl.$^5$ .............................................. B60N 1/04
[52] U.S. Cl. ...................................... 297/341; 248/429
[58] Field of Search ............... 297/341, 340, 344, 355, 297/346, 378, 383, 379, 339, 366; 248/429, 430; 296/65.1

[56] References Cited

U.S. PATENT DOCUMENTS

| | | | |
|---|---|---|---|
| 4,101,169 | 7/1978 | Muraishi et al. | 297/341 |
| 4,143,911 | 3/1979 | Sakakibara et al. | 297/341 |
| 4,159,147 | 6/1979 | Kiyomitsu et al. | 297/341 |
| 4,621,867 | 11/1986 | Perring et al. | 248/429 X |
| 4,671,571 | 6/1987 | Gionet | 248/429 X |
| 4,742,983 | 5/1988 | Nihei | 248/429 |

FOREIGN PATENT DOCUMENTS 60-94835  5/1985  Japan .
1366362  9/1974  United Kingdom .

Primary Examiner—Laurie K. Cranmer
Assistant Examiner—James M. Gardner
Attorney, Agent, or Firm—Foley & Lardner

[57] ABSTRACT

A walk-in device for use in a seat slide device is disclosed. The seat slide device includes a stationary rail, a movable rail slidably engaged with the stationary rail, and a locking mechanism for locking and unlocking the movable rail relative to the stationary rail when a first member is turned in first and second directions respectively. The walk-in device comprises a base member secured to the movable rail; a first lever pivotally connected to the base member, the first lever being turned between a first position wherein the first member is kept unchanged and a second position wherein a part of the first lever abuts against the first member to turn the same in the second direction; a second lever pivotally connected to the base member, the second lever having a projection which is slidably engageable with a side wall of the stationary rail under a certain condition; a link structure for providing a linkage connection between the first and second levers; and a spring for biasing the second lever in a direction to press the projection toward the stationary rail, wherein the link structure is so constructed that when the first lever assumes the first position, the second lever is prevented from turning, and when the first lever assumes the second position and the projection of the second lever is disengaged from an end of the stationary rail, the second lever is turned due to the force of the spring in a direction to suppress the turning of the first lever toward the first position.

7 Claims, 2 Drawing Sheets

WALK-IN DEVICE OF AUTOMOTIVE SEAT HAVING COOPERATING PIVOTED LEVERS

BACKGROUND OF THE INVENTION

1. Field of the Invention

The present invention relates in general to an automotive seat having a seat proper and an inclinable seatback, and more particularly, to a walk-in device of the seat, which functions to facilitate egress and ingress of a rear seat passenger of a motor vehicle. More specifically, the present invention is concerned with a walk-in device incorporated with a seat slide device, in which when the seatback is inclined forward by a certain degree, a locked condition of the seat slide device is cancelled and thus thereafter the seat is permitted to slide forward for providing the rear seat passenger with a larger foot space.

2. Description of the Prior Art

Hitherto, various walk-in devices have been proposed and put into practical use particularly in the field of two-door type passenger motor vehicles.

The walk-in devices hitherto proposed are almost of a type which, as is shown in Japanese Patent First Provisional Publication No. 60-94835, comprises a so-called "return memory mechanism" which functions to permit a locking mechanism of the seat slide device to lock the seat slide device when, after completion of the walk-in operation, the seat is moved back to a predetermined middle position. For the locking of the seat slide device, the return memory mechanism has a pivotal memory lever carried by a movable rail of the seat slide device and a stopper plate fixed to one corresponding stationary rail of the seat slide device. That is, when the seat is moved back to the predetermined middle position, the memory lever is brought into abutment with the fixed stopper plate and thus pivoted in a direction to permit the locking operation of the locking mechanism.

However, due to inherent construction, the walk-in device of this type is compelled to use numerous parts. Thus, the seat assembly including such walk-in device becomes heavy and complicated in construction. Furthermore, using numerous parts causes increase in production cost of the seat.

SUMMARY OF THE INVENTION

It is therefore an object of the present invention to provide a walk-in device which is simple in construction, economical to manufacture and efficient in operation.

According to the present invention, there is provided a walk-in device which has no means which corresponds to the stopper plate employed in the above-described conventional walk-in device.

According to the present invention, there is provided a walk-in device for use in a seat slide device including a stationary rail, a movable rail slidably engaged with the stationary rail, and a locking mechanism for locking and unlocking the movable rail relative to the stationary rail when a first member is turned in first and second directions respectively. The walk-in device comprises a base member secured to the movable rail; a first lever pivotally connected to the base member, the first lever being turned between a first position wherein the first member is kept unchanged and a second position wherein a part of the first lever abuts against the first member to turn the same in the second direction; a second lever pivotally connected to the base member, the second lever having a projection which is slidably engageable with a side wall of the stationary rail under a certain condition; link means for providing a linkage connection between the first and second levers; and biasing means for biasing the second lever in a direction to press the projection toward the stationary rail, wherein the link means is so constructed that when the first lever assumes the first position, the second lever is prevented from turning, and when the first lever assumes the second position and the projection of the second lever is disengaged from an end of the stationary rail, the second lever is turned due to the force of the biasing means in a direction to suppress the turning of the first lever toward the first position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
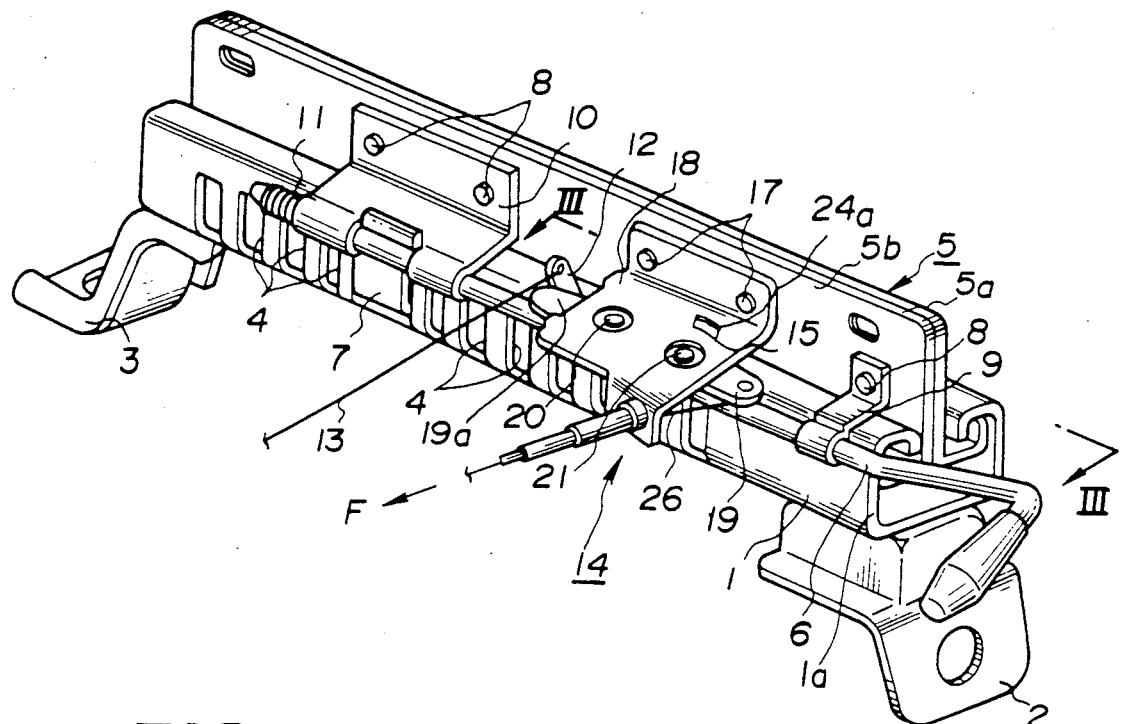
FIG. 1 is a perspective view of a seat slide device to which a walk-in device of the present invention is practically applied.

Referring to the drawings, particularly FIG. 1, there is shown a left unit of a seat slide device, to which a walk-in device of the present invention is applied. Although not shown in the drawing, a right unit similar to the illustrated left unit is arranged to extend along the left unit. It is to be noted that when mounted on a vehicle floor, the illustrated left unit is so oriented that the right portion as viewed in FIG. 1 is directed forward with respect to the vehicle.

The unit of the seat slide device comprises a lower or stationary rail 1 which has a generally C-shaped cross section. The lower rail 1 is mounted through front and rear supporting brackets 2 and 3 on the vehicle floor having its longitudinally extending slit directed upward, as shown. The lower rail 1 is formed at its inside wall with a plurality of longitudinally aligned notches 4.

Slidably engaged with the lower rail 1 is an upper or movable rail 5 which has a reversed T-shaped cross section. The upper rail 5 is constructed by joining two identical channel plates 5a and 5b in back-to-back manner, each plate having a generally L-shaped cross section. As shown, the upper rail 5 is slidably engaged with the lower rail 1 having its horizontal lower part slidably interlocked with the slitted upper horizontal part of the lower rail 1. Although not shown in the drawing, a plurality of rollers are disposed in the lower rail 1 to bear the horizontal lower part of the upper rail 5. Thus, the upper rail 5 is smoothly moved in fore-and-aft direction relative to the fixed lower rail 1.

Although not shown in the drawings, a seat including a seat proper and an inclinable seatback is mounted on the upper rails 5 of the left and right units of the seat slide device.

Designated by numeral 6 is a control rod which has at its front part a handle 6a integral therewith and at its rear part a latch pawl 7 secured thereto. The latch pawl 7 is engageable with selected one of the notches 4 of the lower rail 1, as will become apparent hereinafter. The control rod 6 is rotatably held by front and rear brackets 9 and 10 which are secured to the upper rail 5 by means of rivets 8.

A coil spring 11 is disposed about a rear end of the control rod 6 having one end hooked to the rear bracket 10 and the other end secured to the control rod 6, so that the control rod 6 is biased to rotate in a counterclockwise direction in FIG. 1, that is, in a direction to press the latch pawl 7 toward the notched inside wall of the lower rail 1.

Thus, when the upper rail 5 assumes a position with the latch pawl 7 in coincident with one of the notches 4 of the lower rail 1, the latch pawl 7 is forced to latchingly engage with the selected notch 4 thereby to lock the upper rail 5 at a certain position relative to the fixed lower rail 1. The latching engagement of the latch pawl 7 with the notch 4 is cancelled when the handle 6a of the control rod 6 is turned in a clockwise direction in FIG. 1 against the force of the spring 11. Under this condition, the seat is freely movable forward and rearward for the position adjustment.

Designated by numeral 12 is a drive lever which is secured to the control rod 6 to move therewith. A wire 13 extends from the driver lever 12 to a similar driver lever (not shown) installed in the right unit of the seat slide device. With provision of this wire 13, the operations of the latch pawls 7 of the left and right units of the seat slide device are simultaneously achieved.

A walk-in device is designated by numeral 14, which is carried by the upper rail 5.

Figure 2:
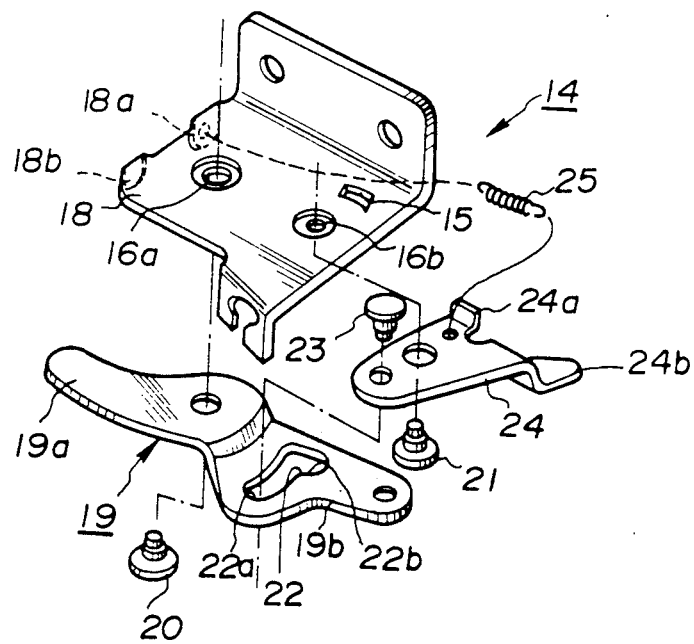
FIG. 2 is an exploded view of an essential portion of the walk in device of the invention.

As is best shown in FIG. 2, the walk-in device 14 comprises a base member 18 secured through rivets 17 to the upper rail 5. The base member 18 has at its flat major portion two openings 16a and 16b. An arcuate slot 15 is formed in the flat major portion, which is concentrical with the opening 16b. The base member 18 has further two downwardly bent lugs 18a and 18b, as shown.

A first lever 19 including front and rear arm parts 19b and 19a is pivotally connected to the flat major portion of the base member 18. For this pivoting, a pivot pin 20 passes through an opening (no numeral) formed in the rear arm part 19a and is mated with the opening 16a of the base member 18. As is seen from FIG. 1, the rear arm part 19a is engageable at one side with the drive lever 12 of the control rod 6. The rear arm part 19a is further engageable at the other side with the downwardly bent lug 18b of the base member 18 thereby to limit the counterclockwise rotation of the first lever 19 about the pivot pin 20. The front arm part 19b is formed with a generally L-shaped guide slot 22. That is, the slot 22 includes a longer part 22a and a shorter part 22b which are merged at a junction part.

A second lever 24 is located in a thin space defined between the front arm part 19b of the first lever 19 and the flat major portion of the base member 18, which lever 24 is pivotally connected to the flat major portion of the base member 18 through a pivot pin 21 mated with the opening 16b. The second lever 24 has a guide pin 23 slidably engaged with the L-shaped guide slot 22 of the first lever 19.

An extension spring 25 is employed for biasing the second lever 24 to pivot about the pivot pin 21 in a counterclockwise direction in FIGS. 1 and 2. For this biasing, the spring 25 has one end hooked to the downwardly bent lug 18a of the base member 18 and the other end hooked to an opening (no numeral) formed in the second lever 24.

The second lever 24 has an upwardly bent lug 24a which is loosely received in the arcuate slot 15 of the base member 18. Thus, the pivotal movement of the second lever 24 about the pivot pin 21 is limited within an angular range defined by the circumferential size of the arcuate slot 15.

A drive cable 26 is connected to the front arm part 19b of the first lever 19, which extends to a seat reclining mechanism (not shown) incorporated with the seat. That is, when a seatback of the seat is inclined forward, the drive cable 26 is pulled in the direction of the arrow "F" thereby to turn the first lever 19 in a clockwise direction in FIGS. 1 and 2.

As is best shown in FIG. 2, the second lever 24 is formed with a rounded projection 24b which projects toward the inside wall of the lower rail 1. More specifically, due to the biasing force of the spring 25, the rounded projection 24b is pressed against the inside wall of the lower rail 1 when the seat assumes a certain locked position.

In the following, operation will be described with reference to the drawings.

Figure 3:
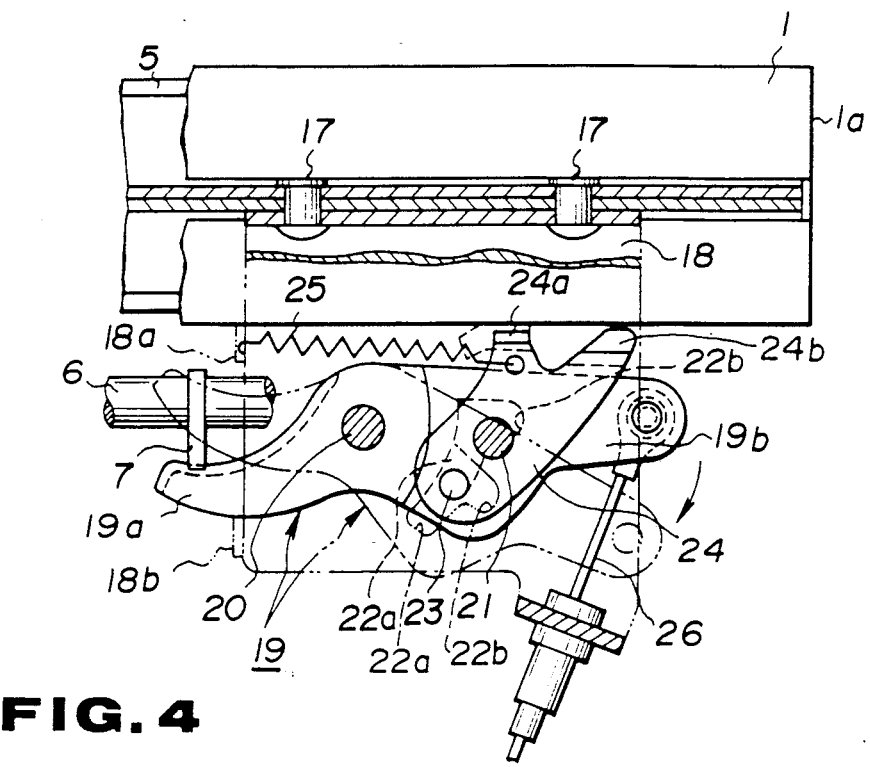
FIG. 3 is a sectional, but somewhat enlarged, view taken along the line III—III of FIG. 1, showing an inoperative condition of the walk-in device.

For ease of understanding, the description will be commenced with respect to a condition wherein the seat assumes a certain locked position having the seatback kept at a certain raised position. Under this condition, the latch pawl 7 is latchingly engaged with one of the notches 4 of the lower rail 1 as shown in FIG. 1, the second lever 24 assumes a rest position having the rounded projection 24b placed near the inside wall of the lower rail 1 as shown in FIG. 3, and the first lever 19 assumes a rest position as illustrated by a solid line in FIG. 3 keeping the rear end part 19a in contact with the stopper lug 18b. It is to be noted that under this condition, the guide pin 23 of the second lever 24 is located at the extreme end of the longer part 22a of the L-shaped guide slot 22 of the first lever 19.

When, for facilitation of egress and ingress, the seatback is inclined forward by a certain degree, the drive cable 26 is pulled in the direction of the arrow "F". With this, the first lever 19 is pivoted about the pivot pin 20 in a clockwise direction in FIG. 3 and thus the rear end part 19a of the first lever 19 is pressed against the drive lever 12 to turn the control rod 6 in a clockwise direction in FIG. 1. Thus, the engagement of the latch pawl 7 with the notch 4 of the lower rail 1 is cancelled and thus thereafter the seat is permitted to slide forward for providing the rear of the seat with a larger foot space for a rear seat passenger. Although not shown in the drawing, a spring is used for automatically achieving the forward movement of the seat upon cancelling of the engagement of the latch pawl 7 with the notch 4.

During the clockwise turning of the first lever 19 about the pivot pin 20, the extreme end of the longer part 22a of the L-shaped guide slot 22 moves away from the guide pin 23 of the second lever 24 and finally puts the guide pin 23 at the junction part of the L-shaped guide slot 22. Thus, the blocking against a counterclockwise rotation of the second lever 24 by the first lever 19 is cancelled. However, this time, the rounded projection 24b of the second lever 24 becomes in abutment with the inside wall of the lower rail 1 thereby preventing the counterclockwise rotation of the second lever 24 about the pivot pin 21. This prevents the guide pin 23 from moving toward the extreme end of the shorter part 22b of the L-shaped guide slot 22.

Thus, when the seatback is raised just after forward inclination of the same, the return movement of the first lever 19 is quickly carried out and thus the seat can be relocked at the former position.

Figure 4:
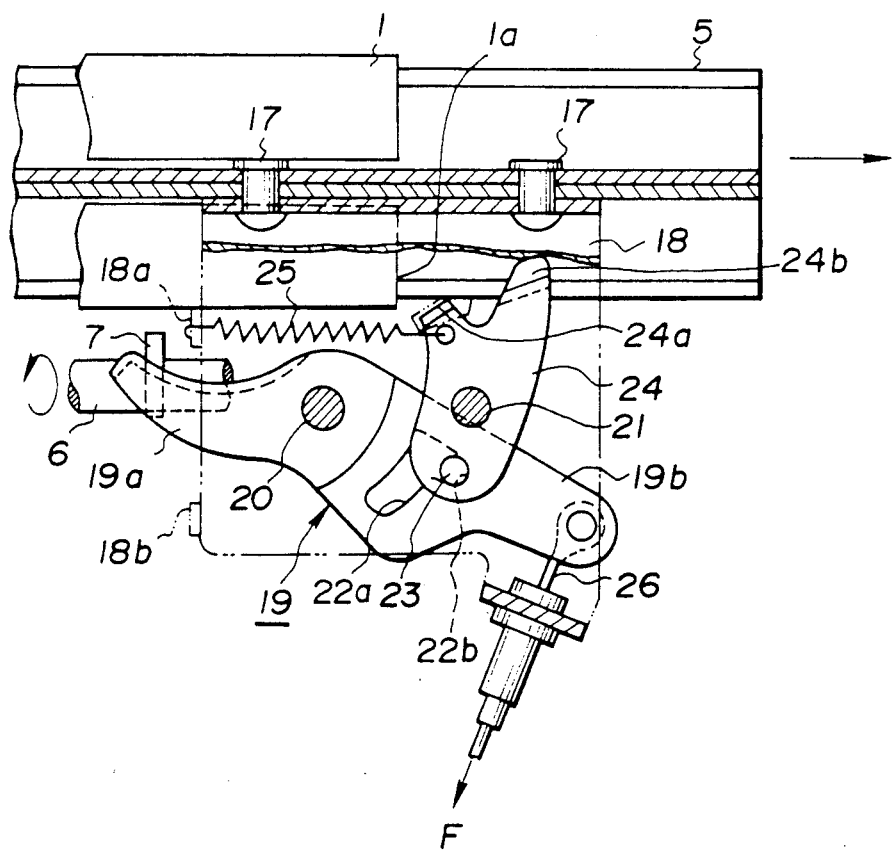
FIG. 4 is a view similar to FIG. 3, but showing an operative condition of the walk-in device.

When, with the seatback kept inclined forward, the seat is moved forward, the rounded projection 24b of the second lever 24, which has been in contact with the inside wall of the lower rail 1, is disengaged from a front edge 1a of the lower rail 1, as is seen from FIG. 4, permitting a counterclockwise rotation of the second lever 24 about the pivot pin 21 moving the guide pin 23 toward the extreme end of the shorter part 22b of the L-shaped guide slot 22 of the first lever 19.

As a result, the counterclockwise rotation of the first lever 19 is blocked due to abutment of the guide pin 23 against a side wall of the shorter part 22b of the L-shaped guide slot 22, as is seen from FIG. 4. In fact, under this condition, the guide pin 23 is forced to abut against the extreme end of the shorter part 22b of the slot 22 due to the force produced by the biasing spring 25.

Thus, thereafter, the seat can be moved to the frontmost position freely without manipulating the seatback.

When, after completion of egress or ingress, the seat is moved back raising the seatback and brought to the certain position, the rounded projection 24b of the second lever 24 is brought into abutment with the front edge 1a of the lower rail 1 and forced to pivot in a clockwise direction in FIG. 4 moving the guide pin 23 toward the junction part of the L-shaped guide slot 22. With this, the rounded projection 24b of the second lever 24 is forced to get on the inside wall of the lower rail 1 and the first lever 19 is permitted to pivot in a counterclockwise direction in FIG. 4 and thus, the drive lever 12 of the control rod 6 is released from being interrupted by the first lever 19.

Thus, thereafter, the latch pawl 7 is brought into latching engagement with a neighbouring one of the notches 4 of the lower rail 1. With this, the seat is locked at the predetermined middle position.

It is to be noted that the latched position of the upper rail 5 thus provided by the walk-in device relative to the lower rail 1 is adjustable by changing the position of second lever 24 relative to the front edge 1a of the lower rail 1.

It is further to be noted that manipulation of the handle 6a of the control rod 6 for disengaging the latch pawl 7 from the notches 4 is carried out without affecting the walk-in device.

In the following, advantages of the present invention will be described.

First, since the front edge 1a of the lower rail 1 is effectively used for actuating the second lever 24, there is no need of using a separate member which corresponds to the fixed stopper plate employed in the aforementioned conventional walk-in device. Thus, simplification in construction and economical manufacturing are available in the present invention.

Second, since the parts of the walk-in device are entirely mounted to the upper rail 5, the lower rail 1 has an interchangeability with that used in a seat slide device having no walk-in device.

What is claimed is:

1. In a seat slide device including a stationary rail, a movable rail slidably engaged with said stationary rail, and a locking mechanism for locking and unlocking said movable rail relative to said stationary rail when a first member is turned in first and second directions respectively, a walk-in device comprising:
a base member secured to said movable rail;
a first lever pivotally connected to said base member, said first lever being turned between a first position wherein said first member is kept unchanged and a second position wherein a part of said first lever abuts against said first member to turn the same in said second direction;
a second lever pivotally connected to said base member, said second lever having a projection which is slidably engageable with a side wall of said stationary rail under a certain condition;
link means for providing a linkage connection between said first and second levers, said link means including slot means defining in said first lever a generally L-shaped guide slot and a structure held by said second lever and slidably engaged with said guide slot; and
biasing means for biasing said second lever in a direction to press said projection toward said stationary rail,
wherein said slot means and said structure of said link means are engaged whereby when said first level assumes said first position, said second lever is prevented from turning, and when said first lever assumes said second position and said projection of said second lever is disengaged from an end of said stationary rail, said second lever is turned due to the force of said biasing means in a direction to suppress the turning of said first lever toward said first position.

2. A walk-in device as claimed in claim 1, in which said projection of said second lever is rounded.

3. A walk-in device as claimed in claim 2, in which said second lever is pivotally received in a space which is defined between said base member and said first lever.

4. A walk-in device as claimed in claim 3, further comprising first stopper means by which the pivotal movement of said first lever relative to said base member is limited and a second stopper means by which the pivotal movement of said second lever relative to said base member is limited.

5. A walk-in device as claimed in claim 4, in which said first stopper means comprises a lug integrally defined by said base member.

6. A walk-in device as claimed in claim 5, in which said second stopper means comprises:
a stopper lug integrally defined by said second lever; and
means defining in said base member an arcuate slot into which said stopper lug is slidably inserted.

7. A walk-in device as claimed in claim 6, in which said biasing means is a spring which has one end hooked to said base member and the other end hooked to said second lever.

* * * * *